Figure 1:
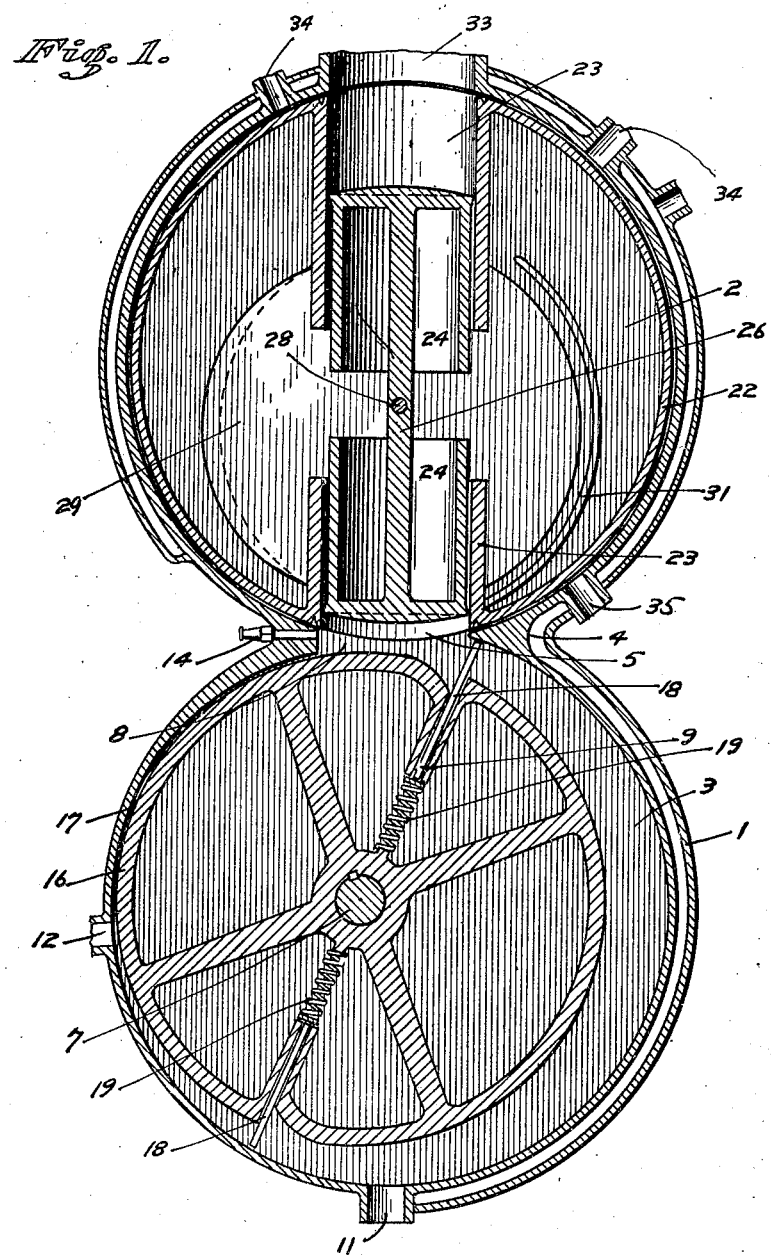

Dec. 19, 1922.

J. H. McCARTHY.
ROTARY GAS ENGINE.
FILED JUNE 1, 1921.

1,439,629.

2 SHEETS—SHEET 1.

INVENTOR.
JOHN H. McCARTHY

BY

ATTORNEY.

Dec. 19, 1922.
J. H. McCARTHY.
ROTARY GAS ENGINE.
FILED JUNE 1, 1921.
1,439,629.
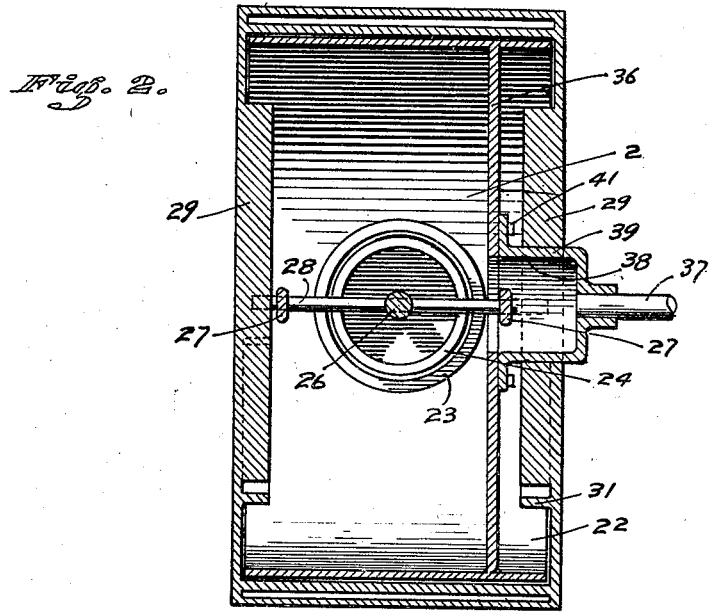
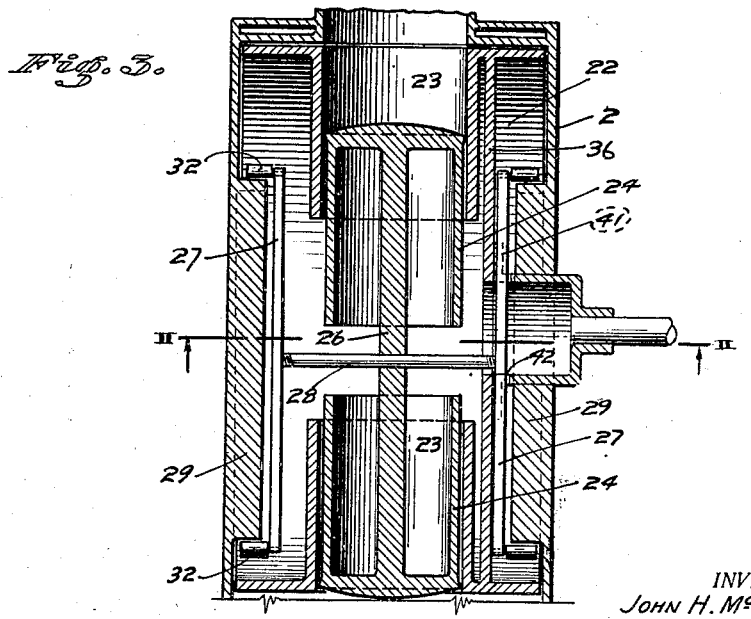
INVENTOR.
JOHN H. McCARTHY
BY
ATTORNEY.

Patented Dec. 19, 1922.

1,439,629

UNITED STATES PATENT OFFICE.

JOHN H. McCARTHY, OF SPOKANE, WASHINGTON.

ROTARY GAS ENGINE.

Application filed June 1, 1921. Serial No. 474,157.

*To all whom it may concern:*

Be it known that I, JOHN H. McCARTHY, a citizen of the United States, and resident of Spokane, county of Spokane, and State of Washington, have invented a new and useful Rotary Gas Engine, of which the following is a specification.

The present invention relates to improvements in rotary internal combustion engines and its object is to provide an engine of this character combining the efficiency of the reciprocal engine with the ease and smoothness in operation of the rotary engine. More particularly I intend in my new device to use the reciprocating motions of a piston in a cylinder as a means of compressing the fuel and forcing it into the combustion chamber while the cylinder is passing the latter on a rotary motion.

I attain this object by means of the mechanism illustrated in the accompanying drawing, in which Figure 1 represents a vertical section through my rotary engine, Figure 2 a horizontal section through the charge feeding device, and Figure 3 a vertical section through the upper part of Figure 1, at right angles to the view of Figure 1.

Referring to the drawing in detail, it will be seen that my rotary engine 1 comprises two cylindrical casings 2 and 3 joined at 4 so as to leave a passage 5 between them of convenient size to answer the purposes outlined hereinafter.

The lower one of the two casings contains the combustion chamber proper 8, a rotary piston arrangement 9, the exhausts 11 and 12 and means for igniting the charge, as for instance the spark plug 14. The piston arrangement comprises a rotary wheel 16 mounted on the shaft 7 adapted to fill the width of the cylinder and to come in close contact with the periphery at 17, that is, at a part reached by each point on the circumference of the wheel just before it passes the combustion chamber. The wheel, being mounted eccentrically with reference to the cylinder and touching a part of the periphery only, leaves a passage between the wheel and the cylinder at the other part of the circumference, which passage widens both ways as its distance from 17 increases. This passage is the combustion chamber of my device and its piston is represented by the radial blades 18, the outer ends of which are adapted to be kept in close contact with the periphery of the cylinder by means of the springs (19), which have a tendency to press the blades outward, but yield to the influence of the periphery on the pistons. It can easily be seen that, assuming the wheel to rotate clockwise in Figure 1, the explosion of a charge in the combustion chamber rearwardly of the upper piston will force the latter forward to swing around its center, thus turning the wheel, until it passes the first exhaust 11, when the larger quantity of gas will escape or be driven out by the next piston. Any gas that has not escaped through the exhaust 11 by the time the next piston reaches the same, will be forced out by the latter piston through the second exhaust 12.

Thus a proper charge fed into the combustion chamber at the proper times will cause the wheel to rotate. I am aware that arrangements like the one described thus far have been used before and I do not claim to be the inventor of these features.

My invention comprises the feeding means for this cylinder, as shown in the casing 2. The latter contains an inner cylinder 22 rotatably mounted therein. The peripheral part of the latter cylinder is traversed by two oppositely arranged cylinders 23 of smaller diameter and alined with each other. For these two cylinders I provide two pistons 24, secured at either end of the rod 26 and adapted to reciprocate in the two cylinders so that in one extreme position the outer end of one piston is substantially flush with the peripheral surface of the cylinder 23, while in the other extreme position the other piston is flush with the peripheral surface of the cylinder 23 at the opposite end. These pistons are reciprocated by means of two forks 27 secured to the ends of the cross-member 28 fastened to the central part of the connecting rod 26. Each of the forks engages a nearly circular, eccentric projection 29 secured to each end of the casing so as to span said eccentric, as shown in Figure 3. It is apparent that, as the cylinder 22 rotates within the casing, the forks, spanning the two eccentrics, which are placed in corresponding positions on the ends of the casing, follow the outlines of the same. The eccentrics are so placed, that their centers lie on the central plane of both chambers 2 and 3 and between the two centers of said two chambers. In the position indicated in Figure 1, that is, when the center line of the two transverse cylinders 23 coincides with the said central plane, the two forks will just span the eccentric, that is, its prongs will touch the rim of the eccentric at the top and at the bottom. But as the cylinder 22 begins to rotate, the forks slide along the eccentric, and the pistons begin to rotate. They rotate on the center of the piston rod, which latter center does not remain stationary but describes a small circle during the rotation so that it ceases to coincide with the center of the eccentric.

If the eccentrics were true circles, it follows that the forks, adapted to span the full diametrical width of the eccentric, would more than span the same in any other position and while the upper prongs of the forks would remain in touch with the eccentric since it bears against the latter, the lower prong would lose its contact with the same. This being undesirable, I change the shape of the eccentric from a true circular form, as indicated in dotted lines, to a slightly oblong form, so that both prongs of each fork remain in constant contact with the eccentric. It will further appear that in a counter-clockwise rotation of the cylinder 22 only the upper prongs of the forks would bear against the eccentric, the lower ones running idly along the eccentric. To overcome this feature and to equally distribute the load over both prongs of each fork, I provide on the right hand side of each cover a guide 31 running parallel to the eccentric and adapted to bear against the lower prongs on their upward travel. To avoid friction as much as possible, I provide roller bearings 32 around the prongs to make frictional contact with the eccentric and the guide.

The principal intake 33 is shown in the drawing at the end opposite the passage 5 and additional intakes 34 may be provided in different places. Proper water jackets are carried around the cylinders for cooling the same. Suitable cooling means may also be provided for the transverse cylinders containing the pistons, either by fans or by any other means adapted for that purpose.

Rotary motion is imparted to the cylinder 22 from the shaft 7 in any manner desired. In the drawing I show as one possible means for transmitting power to the cylinder an inner wall 36 which has a circular opening in the center adapted to furnish sufficient clearance for the rotating motion of the cross-member 28 and which is secured in a place where it does not interfere with the working of the forks on the eccentric. Its particular position apart from this requisite is of no importance and it might be found more convenient and effective to secure this wall centrally with reference to the cylinder. It is connected with the shaft 37 by the hollow shaft 38 supported in one of the walls of the casing as shown at 39 and secured to the inner wall 36 by means of the flanges 41. Two oppositely arranged perforations 42 allow the arms of the fork to extend through the hollow shaft. Power is transmitted from the shaft 7 to the shaft 37 in any well known manner not shown in the drawing.

The operation of my feeding and compressing means is easily understood. Starting with the position of Figure 1, fuel will enter into the empty space of the upper transverse cylinder through the intake 33. As the inner cylinder 22 begins to rotate, the upper transverse cylinder 23 moves away from the intake, to the left. As soon as it passes the intakes 33 and 34 altogether, the space will be air tightly closed. During the rotation the upper prongs of the forks bear against the eccentric, while the lower prongs bear against the guide 31. The center of the eccentric being below the center of the rotating cylinder 22, the piston will be forced into the space containing the fuel and will compress the same until half a turn has been completed, at which time the upper piston is in the position of the lower piston in Figure 1 and has forced the charge into the combustion chamber, to be there ignited by a properly timed spark. In the meantime the lower piston has travelled in the opposite direction and in receding from the circumference has created a vacuum which will readily draw in a new charge. An exhaust 35 may be provided for any gas that has not been forced into the combustion chamber.

I wish to particularly note that my device is not necessarily confined to the use of two transverse cylinders, and that four or more cylinders may be worked in a similar manner without departing from the spirit of my invention.

I claim:

1. In means for feeding a charge into the combustion chamber of a rotary engine, a cylindrical casing having a peripheral passage leading into said chamber and a fuel intake, an inner cylinder adapted to revolve in said casing having a transverse cylinder adapted to alternately register with the intake and the passage, a piston in said transverse cylinder having a rod thereon, a cross-arm on said rod having two forked ends thereon, and an eccentric secured to each side of the casing adapted to be engaged by said forked ends and to thereby impart reciprocating motion to said piston by which the latter draws a charge into the transverse cylinder through the intake and forces the same into the passage.

2. In means for feeding a charge into the combustion chamber of a rotary engine, a cylindrical casing having a peripheral passage leading into said chamber and a fuel intake, an inner cylinder adapted to revolve in said casing having two transverse cylinders adapted to alternately register with the intake and the passage, a piston in each of said transverse cylinders, a common rod connecting said two pistons, a cross-arm on said rod having two forked ends thereon, and an eccentric secured to each side of the casing adapted to be engaged by said forked ends and to thereby impart reciprocating motion to said piston by which the latter draws a charge into the transverse cylinder through the intake and forces the same into the passage.

JOHN H. McCARTHY.